United States Patent
Wong

(10) Patent No.: US 8,090,578 B2
(45) Date of Patent: *Jan. 3, 2012

(54) METHOD AND SYSTEM FOR A RECOGNITION SYSTEM HAVING A VERIFICATION RECOGNITION SYSTEM

(75) Inventor: Yoon Kean Wong, Menlo Park, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/835,457

(22) Filed: Jul. 13, 2010

(65) Prior Publication Data

US 2010/0277275 A1 Nov. 4, 2010

Related U.S. Application Data

(63) Continuation of application No. 12/018,432, filed on Jan. 23, 2008, now Pat. No. 7,756,706, which is a continuation of application No. 11/200,530, filed on Aug. 8, 2005, now Pat. No. 7,324,938, which is a continuation of application No. 09/976,977, filed on Oct. 11, 2001, now Pat. No. 6,950,795.

(51) Int. Cl.
*G10L 15/00* (2006.01)

(52) U.S. Cl. ........................................................ 704/231
(58) Field of Classification Search .................. 704/231
See application file for complete search history.

(56) References Cited

U.S. PATENT DOCUMENTS

| | | | |
|---|---|---|---|
| 6,950,795 B1 * | 9/2005 | Wong | 704/231 |
| 7,324,938 B1 * | 1/2008 | Wong | 704/231 |
| 7,756,706 B2 * | 7/2010 | Wong | 704/231 |

* cited by examiner

*Primary Examiner* — Susan McFadden

(57) ABSTRACT

A method and system for performing computer implemented recognition. In one method embodiment, the present invention first accesses user input stored in a memory of a mobile device. On the mobile device, the present invention performs a coarse recognition process on the user input to generate a coarse result. The coarse process may operate in real-time. The embodiment then displays a portion of the coarse result on a display screen of the mobile device. The embodiment further performs a detailed recognition process on the user input to generate a detailed result. The detailed process has more recognition patterns and computing resources available to it. The present embodiment performs a comparison of the detailed result and the coarse result. The present embodiment displays a portion of the comparison on the display screen.

20 Claims, 9 Drawing Sheets

METHOD AND SYSTEM FOR A RECOGNITION SYSTEM HAVING A VERIFICATION RECOGNITION SYSTEM

This application is a continuation of and claims priority to U.S. patent application Ser. No. 12/018,432, now U.S. Pat. No. 7,756,706 entitled "Method and System for a Recognition System Having a Verification Recognition System," by Wong filed on Jan. 23, 2008, which is a continuation of and claims priority to U.S. patent application Ser. No. 11/200,530, now U.S. Pat. No. 7,324,938 entitled "Method and System for a Recognition System Having a Verification Recognition System," by Wong filed on Aug. 8, 2005, which is a continuation of and claims priority to U.S. patent application Ser. No. 09/976,977, now U.S. Pat. No. 6,950,795 entitled "Method and System for a Recognition System Having a Verification Recognition System," by Wong filed on Oct. 11, 2001, each of which is incorporated herein in its entirety by reference.

FIELD OF THE INVENTION

The present claimed invention relates to the field of representative technology verification. Specifically, the present claimed invention relates to a method and system for performing computer implemented recognition and verification.

BACKGROUND ART

Presently, there are many areas where recorded information can be processed by computer recognition technology. Examples of these areas include voice information, image information and handwritten information. A computer recognition process can take this information, process it, and format the resulting data in a beneficial manner. Due to the convenient aspects of computer recognition, it is often used in conjunction with an assortment of mobile devices. The list of mobile devices which are compatible with computer recognition is extensive and includes such items as cell phones, digital recorders, and portable digital assistants (PDA's).

In some mobile devices, the use of computer voice recognition is very simplistic. Specifically, in regard to the use of cell phones, voice recognition processes use elementary voice recordings to retrieve a pertinent fact, such as a phone number, or to cause an action, such as dialing a phone number. This type of voice recognition process relies on specific user pre-recorded information in order to facilitate the voice recognition process and only applies to a small set of predetermined commands. Such a recognition process retains a "command and control" type logic and responds only to the correct "do what I say" phraseology.

In other mobile devices, the use of computer voice recognition is a secondary process which is applied to the recorded data at a later time. For example, voice recording devices can be used to record: names and numbers, dates and times, conversations and meetings; among the many possible types of significant sound data. These voice recordings can later undergo a computer recognition processes resulting in a formatted version of the underlying recorded sound data.

Specifically, digital recorders and PDA's are often used as memory aids. Digital recorders (such as the Olympus DS-320 digital voice recorder) and PDA's provide a convenient way to record and recall data. Specifically, while using a digital recording device, the user may title each section, or label each smaller conversation. Further, digital recorders and PDA's can easily be linked to a computer recognition processes. In one example, they can be used with computer voice recognition processes to turn a voice conversation into a text message. In another example, they can be used with computer handwriting recognition processes to turn handwritten information directly into a formatted file.

One disadvantage of computer recognition on digital recorders and PDAs is that they do not allow for timely recall of information. Specifically, the recorded information is retained in voice format on the digital recorder until the connection to a computer is made. Upon connection, the recording undergoes computer recognition processes, but the user is limited to a specific timeline wherein the computer recognition can be accomplished. For example, a digital recording that takes place away from the computer recognition system must remain in a digital voice format until such time as the user is able to employ the external computer recognition process upon the digital recording.

While awaiting the computer recognition process, in order to access the recorded information, the user must navigate through a conversation to arrive at a specific point of interest. This procedure is inconvenient and time consuming. For example, if a specific portion of a conversation is desired for review, the time required for location and replay can result in an inability of the user to concentrate upon real-time events. Specifically, during the search procedure, the user could miss out on important information going on circuitously.

A further problem arises with the inadequacy to amend any portion of the recorded data. Once any information is recorded on a device, the linearity of the recording process causes difficulty with regard to change. Thus, any amendment to the data, while in digital voice format, may require the user to add the amendment to a later portion of the recording. This amendment, which would be out of context of the original information, could become confusing during the recognition process or possibly overlooked by the user upon a cursory review. Further, as the recording undergoes the computer recognition process, the resulting amendment may show up in a completely different and unrelated section of the resulting formatted version.

Thus, a need exists for a method and system for performing computer implemented recognition. A further need exists for a method and system for performing computer implemented recognition which performs a timely recognition process on a mobile device for user feedback. Yet another need exists for a method and system for performing computer implemented which provides a user access to the timely recognition results. Still another need exists for a method and system for performing computer implemented recognition which allows the timely recognition results to be amended.

SUMMARY OF INVENTION

The present invention provides, in various embodiments, a method and system for performing computer implemented recognition. Embodiments of the present invention also provide a method and system for performing computer implemented recognition which meets the above need and which performs a timely recognition process on a mobile device for user feedback. The present invention further provides a method and system for performing computer implemented recognition which meets the above needs and which provides a user access to the timely recognition results. The present invention also provides a method and system for performing computer implemented recognition which meets the above needs and which allows the timely recognition results to be amended.

Specifically, in one embodiment, the present invention first accesses user input stored in a memory of a mobile device. On the mobile device, the present invention performs a coarse recognition process on the user input to generate a coarse result. The coarse process may operate in real-time. The embodiment then displays a portion of the coarse result on a display screen of the mobile device. The embodiment further performs a detailed recognition process on the user input to generate a detailed result. The detailed process has more recognition patterns and computing resources available to it. The present embodiment performs a comparison of the detailed result and the coarse result. The present embodiment displays a portion of the comparison on the display screen.

In one embodiment, the detailed process may be a background process operable on the mobile device. In another embodiment, the detailed recognition process operates on an external computer system. The input data can be speech, handwritten stroke data, image data, etc. The detailed recognition system has more computing resources available to it, while the coarse recognition process is tailored to be a real-time feedback recognition. It is appreciated that normally the result of the detailed recognition process takes precedence over the coarse result. Any manual changes to the coarse result take precedence over the detailed results.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
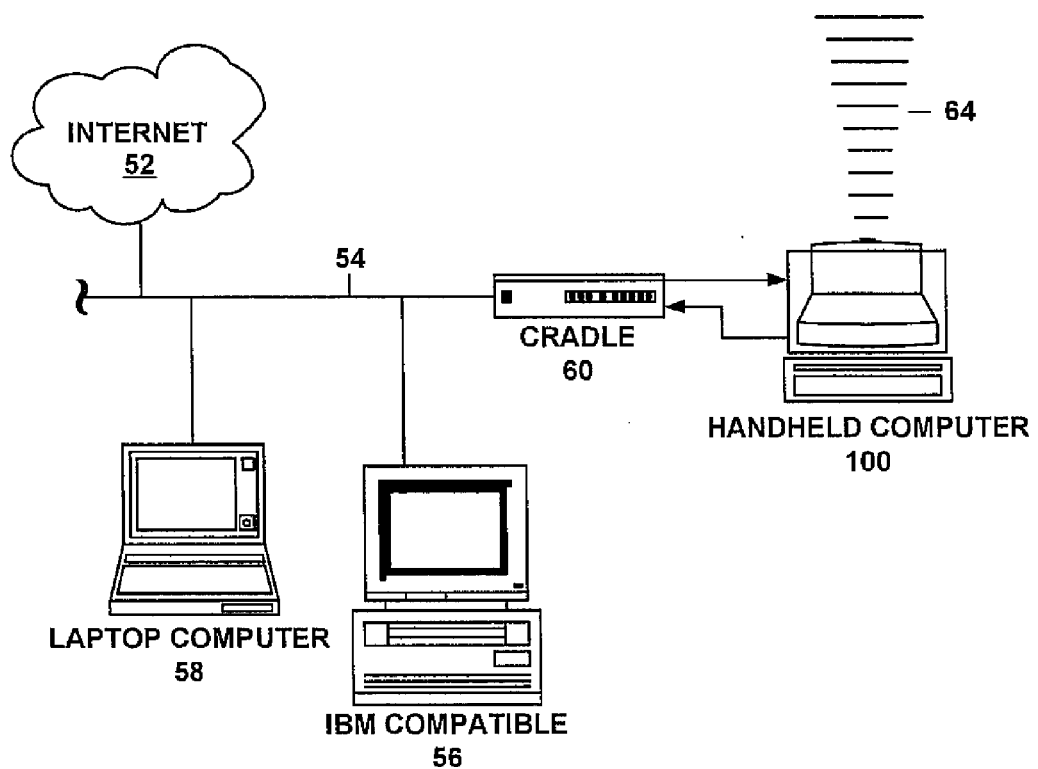
FIG. 1 is a block diagram of an exemplary communication network in which the exemplary computing system can be used in accordance with one embodiment of the present invention.

The drawings referred to in this description should be understood as not being drawn to scale except if specifically noted.

DESCRIPTION OF THE PREFERRED EMBODIMENTS

In the following detailed description of the present invention, a method and system for performing computer implemented recognition and recognition verification, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "performing", "displaying", "determining" or the like, refer to the action and processes of a computer system (e.g., FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., processes 600 and 700) are implemented as program code stored in computer readable memory units of computer systems and are executed by the processor of the computer system. Although a variety of different computer systems can be used with the present invention, an exemplary wireless computer system is shown in FIG. 2 below.

Referring now to FIG. 1, a system 50 that may be used in conjunction with the present invention is shown. It is appreciated that the method and system for performing computer implemented recognition can be used in conjunction with any computer system and that system 50 is illustrative rather than limiting. It is further appreciated that the portable computer system 112 (hereafter known as mobile device 112) described below is only exemplary. System 50 comprises a host computer system 56 which can either be a desktop unit as shown, or, alternatively, can be a laptop computer system 58. Optionally, one or more host computer systems 58 can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the internet 52 using a number of well-known protocols.

Importantly, bus 54 is also coupled to a wireless communications device 60 for receiving and initiating communication with mobile device 112. Mobile device 112 also contains a wireless communication mechanism 64 for sending and receiving information from other devices. The wireless communication mechanism 64 can use infrared communication or other wireless communications such as a Bluetooth protocol.

Figure 2:
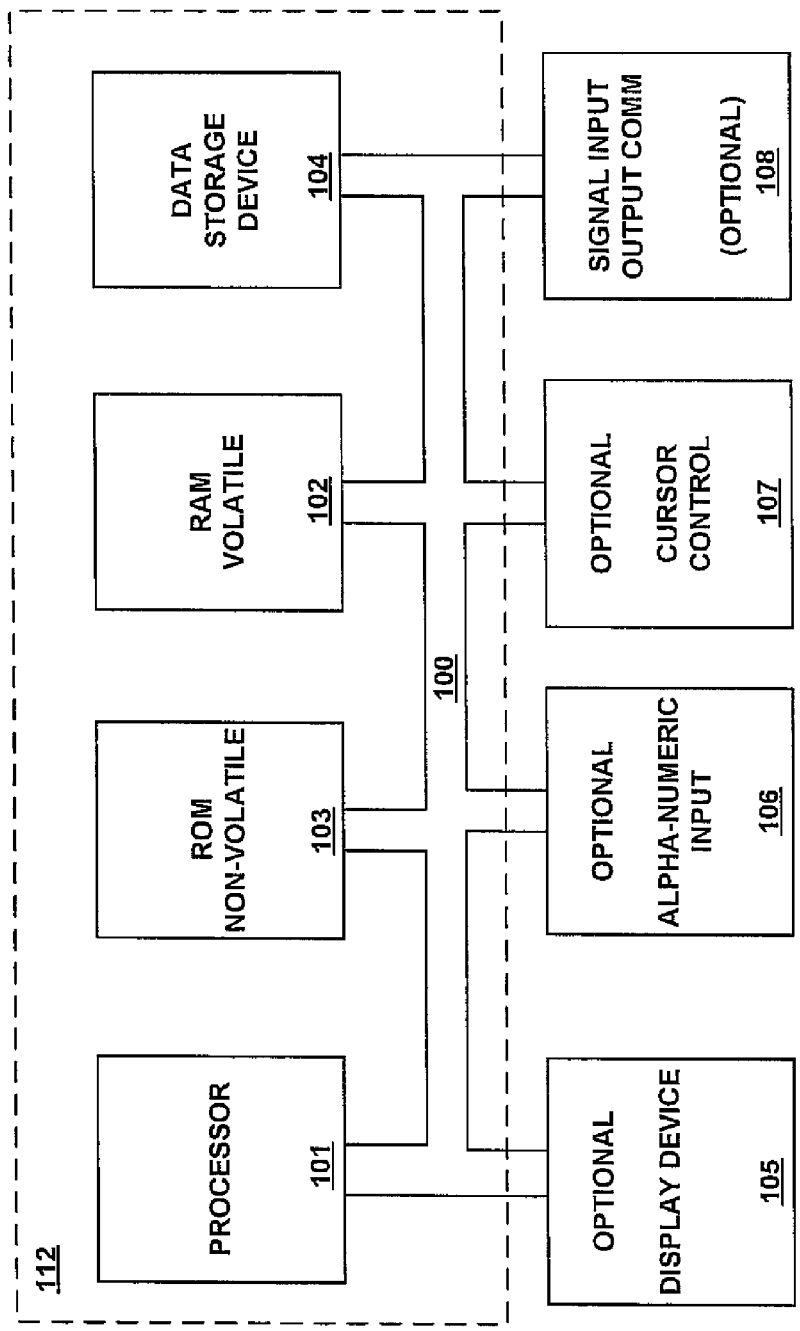
FIG. 2 is a block diagram of exemplary circuitry of a computing system in accordance with one embodiment of the present invention.

Referring now to FIG. 2, a block diagram of exemplary mobile device 112 is shown. Mobile device 112 includes an address/data bus 100 for communicating information, a central processor 101 coupled with bus 100 for processing information and instructions, a volatile memory unit 102 (e.g., random access memory, static RAM, dynamic RAM, etc.) coupled with bus 100 for storing information and instructions for central processor 101 and a non-volatile memory unit 103 (e.g., read only memory, programmable ROM, flash memory, EPROM, EEPROM, etc.) coupled with bus 100 for storing static information and instructions for processor 101. As described above, mobile device 112 also contains an optional display device 105 coupled to bus 100 for displaying information to the computer user. As described further below, portions of memory units 102 and 103 can be removed from mobile device 112. Moreover, mobile device 112 also includes a data storage device 104 (e.g., memory stick) for storing information and instructions. In one embodiment, data storage device 104 is removable from mobile device 112.

Mobile device 112 also includes an optional cursor control or directing device 107 coupled to bus 100 for communicating user input information and command selections to central processor 101. In one implementation, device 107 is a touch screen device incorporated with optional display device 105. In this implementation, device 107 is capable of registering a position on optional display device 105 where a stylus makes contact. Optional display device 105 utilized with mobile device 112 may be a liquid crystal device (LCD), cathode ray tube (CRT), field emission device (FED, also called flat panel CRT) or other display device suitable for creating graphic images and alphanumeric characters recognizable to the user. In one embodiment, optional display device 105 is a flat panel display. Mobile device 112 also includes signal communication interface 108, which is also coupled to bus 100. Communication interface 108 includes an input device such as an audio recording interface as well as a number of wireless communication mechanisms such as infrared or a Bluetooth protocol.

It is appreciated that mobile device 112 described herein illustrates an exemplary configuration of an operational platform upon which embodiments of the present invention can be implemented. Nevertheless, other computer systems with differing configurations can also be used in place of mobile device 112 within the scope of the present invention.

Figure 3:
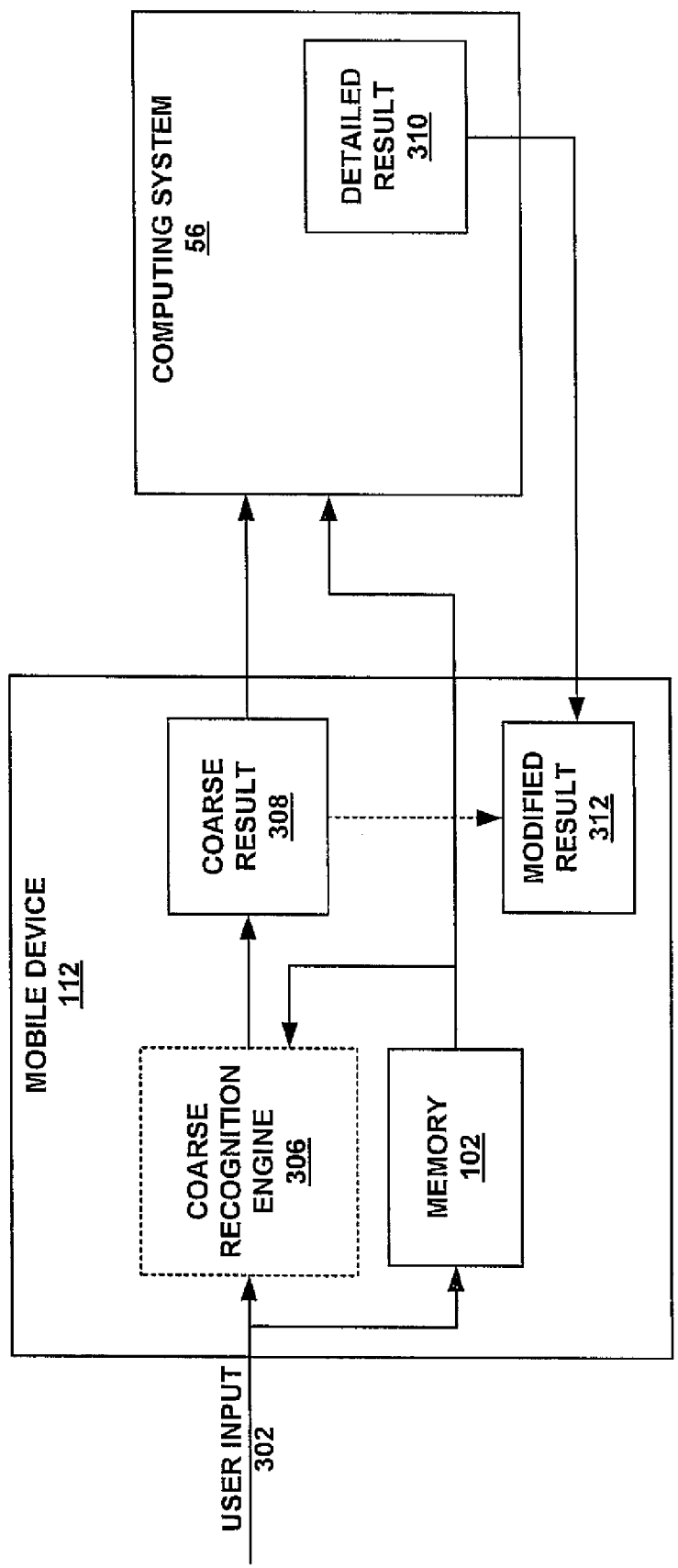
FIG. 3 is a block diagram of exemplary process of two or more separate computing systems in accordance with one embodiment of the present invention.

One embodiment of the system is disclosed in FIG. 3. Specifically, as shown in FIG. 3, the present invention can include, but is not limited to, user input 302 and two computing systems. In one embodiment, user input 302 may be speech data, handwritten stroke data, image data, etc. In one embodiment, the two computing systems are mobile device 112 and computing system 56. Specifically, in one embodiment, mobile device 112 includes coarse recognition engine 306. In one embodiment, coarse recognition engine 306 is a software program that runs on a computer. Further, in one embodiment, a number of different recognition processes can be used with coarse recognition engine 306. Alternatively, in one embodiment, coarse recognition engine 306 may be a specially designed hardware piece made, specifically for real-time voice recognition.

In one embodiment, mobile device 112 includes coarse result 308. In one embodiment, coarse result 308 is the output of coarse recognition engine 306. Specifically, coarse result 308 is a representation of user input 302 after it has completed the recognition processes of coarse recognition engine 306.

In one embodiment, mobile device 112 includes modified result 312. In one embodiment, modified result 312 may be a representation of coarse result 308 and detailed result 310. In one embodiment, detailed result 310 is generated by computing system 56. Specifically, in one embodiment, with regard to modified result 312, computing system 56 has more computing resources available to it, while coarse recognition engine 306 is tailored to be a real-time feedback recognition. Thus, it is appreciated that, in one embodiment, detailed result 310 takes precedence over coarse result 308 as processed by modified result 312. Further, in one embodiment, any manual changes to coarse result 308 take precedence over detailed result 310 as processed by modified result 312.

Figure 6:
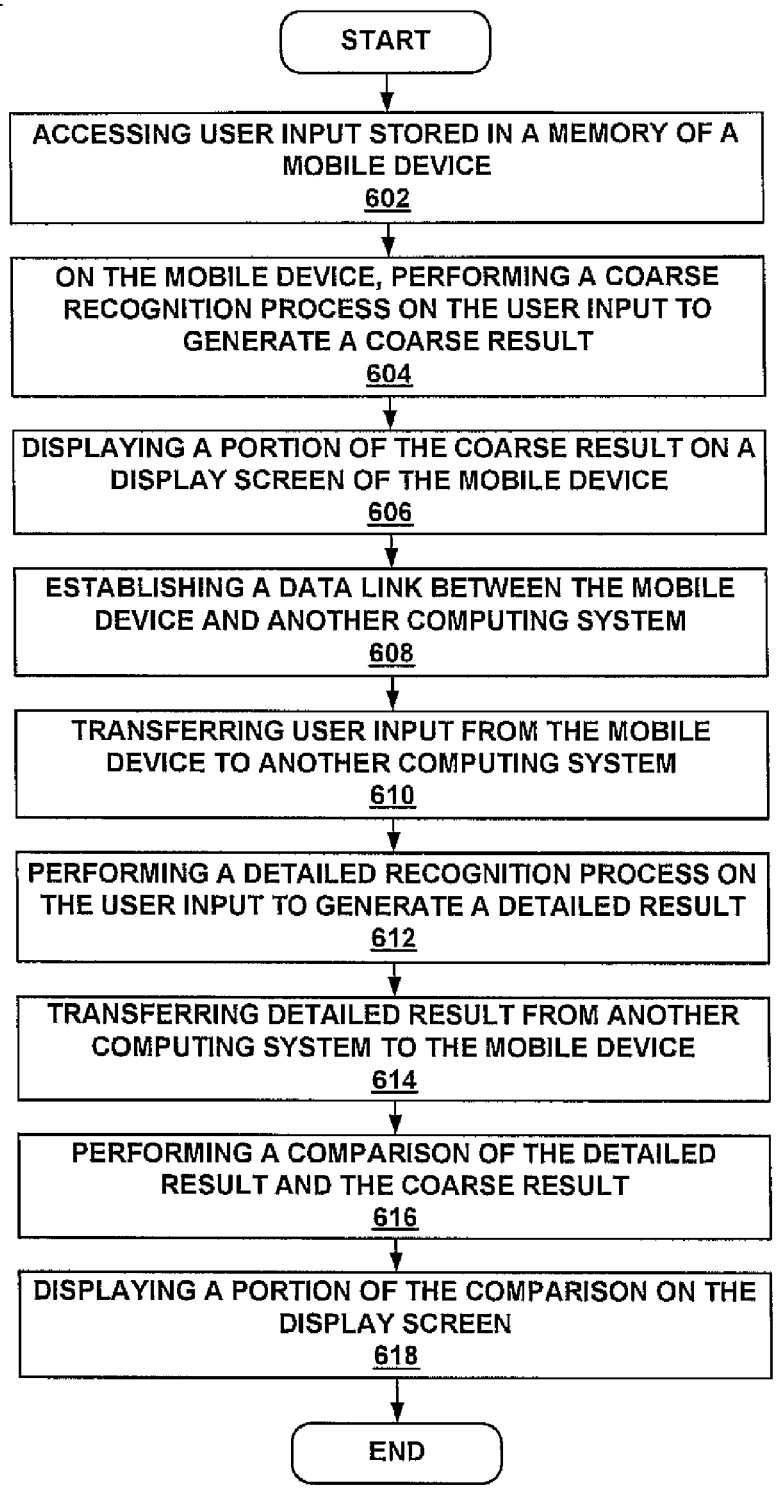
FIG. 6 is a flow chart of steps in an exemplary method for performing computer implemented recognition, in accordance with one embodiment of the present invention.

With reference now to step 602 of FIG. 6 and to FIG. 3, the present invention accesses user input 302 stored in a memory 102 of mobile device 112. In one embodiment, memory 104 may be used. In one embodiment, user input 302 may be speech data. In another embodiment, user input 302 may be handwritten stroke data. In yet another embodiment, user input 302 may be image data.

With reference now to step 604 of FIG. 6 and to FIG. 3, in one embodiment, the present invention, on mobile device 112, performs a coarse recognition process on user input 302 to generate coarse result 308. User input 302 may come directly from an input device or may be accessed from memory 102. In one embodiment, the input device may be communication interface 108. Coarse recognition engine 306 may be implemented as a software recognition process using a number of well known recognition techniques. In one embodiment, the coarse recognition process takes place at coarse recognition engine 306. In one embodiment, coarse recognition engine 306 is constrained by allowable response time and attempts to operate in real-time. In another embodiment, coarse recognition engine 306 is constrained by computing resources.

With reference now to step 606 of FIG. 6 and to FIG. 3, in one embodiment, the present invention displays a portion of coarse result 308 on a display screen on mobile device 112. In one embodiment, the display screen on mobile device 112 is optional display device 105. Although optional display device 105 is explicitly mentioned, the present invention is well suited to the use of a display screen on mobile device 112 other than optional display device 105.

Referring now to step 608 of FIG. 6 and to FIG. 3, in one embodiment, the present invention establishes a data link between mobile device 112 and another computing system 56 separate from mobile device 112. In one embodiment, the data link established between mobile device 112 and computing system 56 is wireless. In yet another embodiment, the data link established between mobile device 112 and computing system 56 is wired. Although in the present embodiment, computing system 56 is explicitly mentioned, the present invention is well suited to the use of computing system 58 or any other separate computing system. Further, the reference to computing system 56 throughout the embodiment of the present invention is maintained merely for purposes of brevity and clarity.

With reference now to step 610 of FIG. 6 and to FIG. 3, in one method embodiment, user input 302 is transferred to computing system 56. In one method embodiment, coarse result 308, or a portion of coarse result 308, is transferred to another computing system 56 separate from mobile device 112 in conjunction with user input 302. In one embodiment, the transfer of coarse result 308, or a portion of coarse result 308, and user input 302 takes place wirelessly using communications device 60 for receiving and initiating communication with a wireless mobile device 112. In another embodiment, the transfer of coarse result 308, or a portion of coarse result 308, and user input 302 takes place wirelessly using communication mechanism 64. The wireless communication mechanism 64 can use infrared communication or other wireless communications such as a Bluetooth protocol.

With reference now to step 612 of FIG. 6 and to FIG. 3, in one embodiment, the present invention performs a detailed recognition process on user input 302 to generate detailed result 310. In one embodiment, computing system 56 maintains a data link with mobile device 112 during the detailed recognition process. In one embodiment, computing system 56 does not maintain a data link with mobile device 112 during the detailed recognition process. Further, in one embodiment, the present invention performs a detailed recognition process on user input 302 in conjunction with coarse result 308, or a portion of coarse result 308, to generate detailed result 310. In one embodiment, detailed result 310 is generated on computing system 56. Specifically, in one embodiment, computing system 56 is not constrained by allowable response time. Further, in one embodiment, computing system 56 is not constrained by computing resources. Detailed recognition process may be implemented as a software process to recognize the user input. This detailed process, as compared to the coarse process, has more pre-stored recognition patterns, has more memory and processing power, and is independent of response time. As a result, this detailed recognition system can be used as a verification for coarse result 308.

With reference now to step 614 of FIG. 6 and to FIG. 3, in one embodiment, the present invention transfers detailed result 310 from another computing system 56 to mobile device 112. In one embodiment, the transfer of detailed result 310 takes place wirelessly using communications device 60 for receiving and initiating communication with a wireless mobile device 112. In another embodiment, the transfer of detailed result 310 takes place wirelessly using communication mechanism 64. The wireless communication. mechanism 64 can use infrared communication or other wireless communications such as a Bluetooth protocol.

Figure 8A:
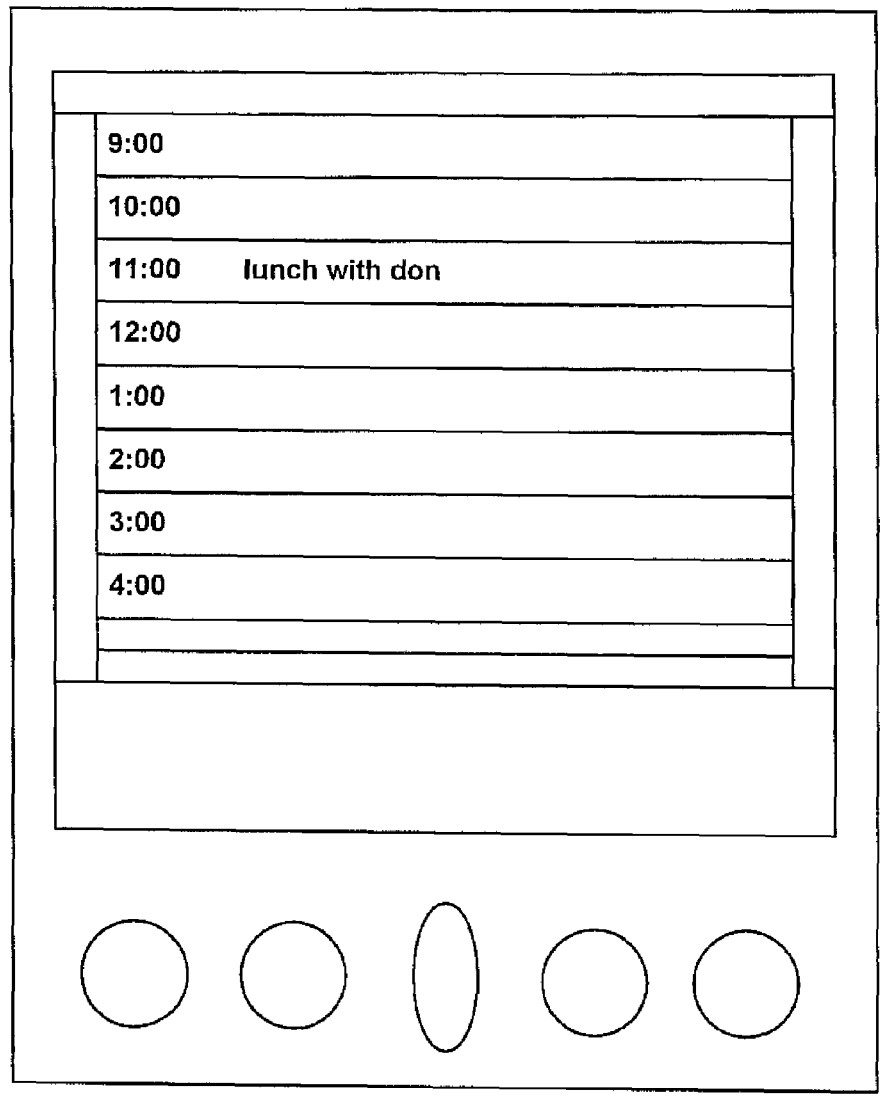
FIGS. 8A-B are examples of the exemplary results, in accordance with one embodiment of the present invention.

With reference now to step 616 of FIG. 6 and to FIG. 3, in one embodiment, the present invention performs a comparison of detailed result 310 and coarse result 308. Referring now to step 618 of FIG. 6 and to FIG. 3, in one embodiment, the present invention displays a portion of the comparison on display screen 105. In one embodiment, modified result 312 is the comparison of detailed result 422 and coarse result 308. For example, FIG. 8A shows one embodiment wherein mobile device 112 accesses user input 302. User input 302 stated "eleven am, lunch with dom." FIG. 8A shows coarse result 308 as shown on optional display device 105 as "eleven am, lunch with don."

Figure 8B:
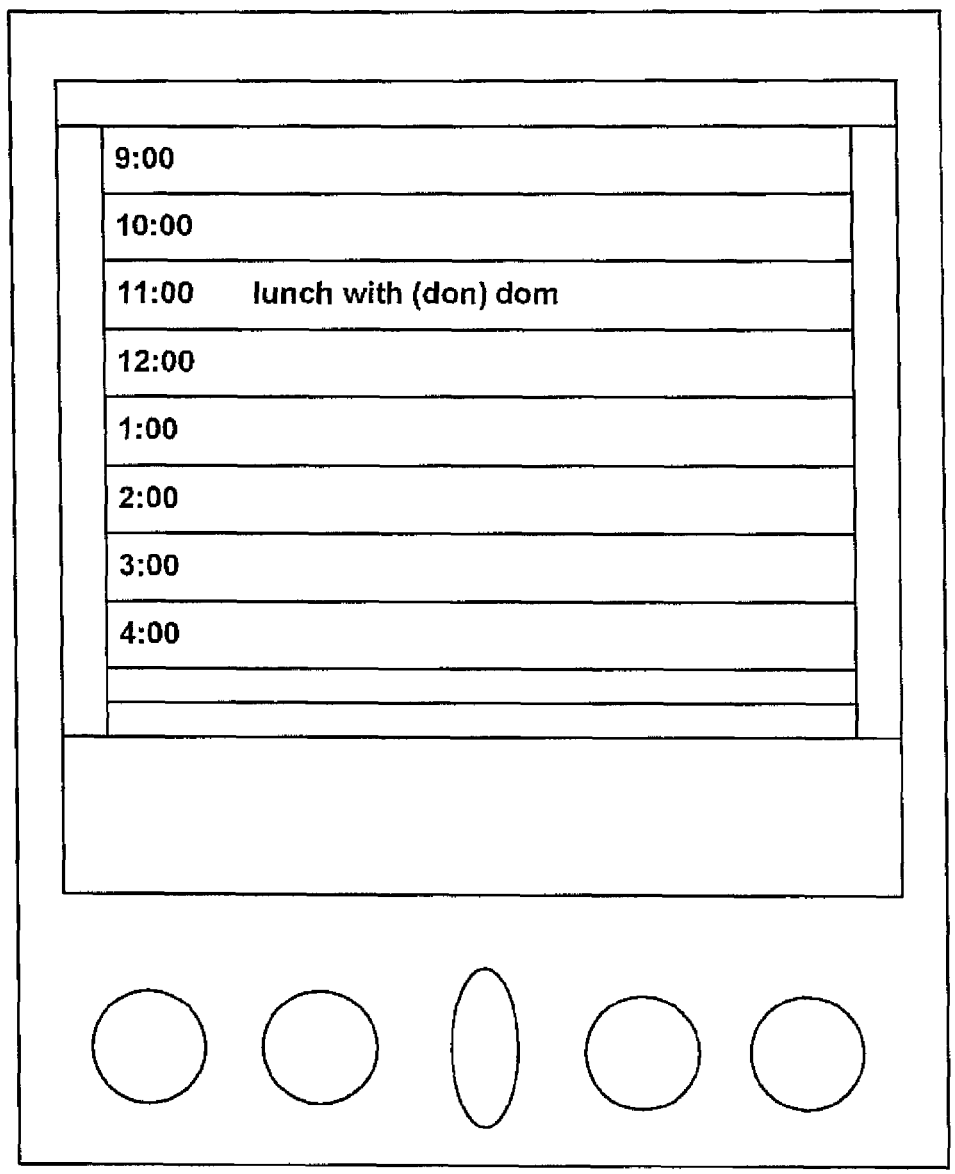

Further, FIG. 8B shows one embodiment wherein, the present invention performs a detailed recognition process which results in "eleven am, lunch with dom." In one embodiment, the present invention performs a comparison of detailed result 310 and coarse result 308. In one embodiment, as shown in FIG. 8B, the difference between detailed result 310 and coarse result 308 is emphasized with visual script differentiation in modified result 312. It is appreciated that any user modifications made to coarse result 308 would take precedence over detailed result 310.

Figure 4:
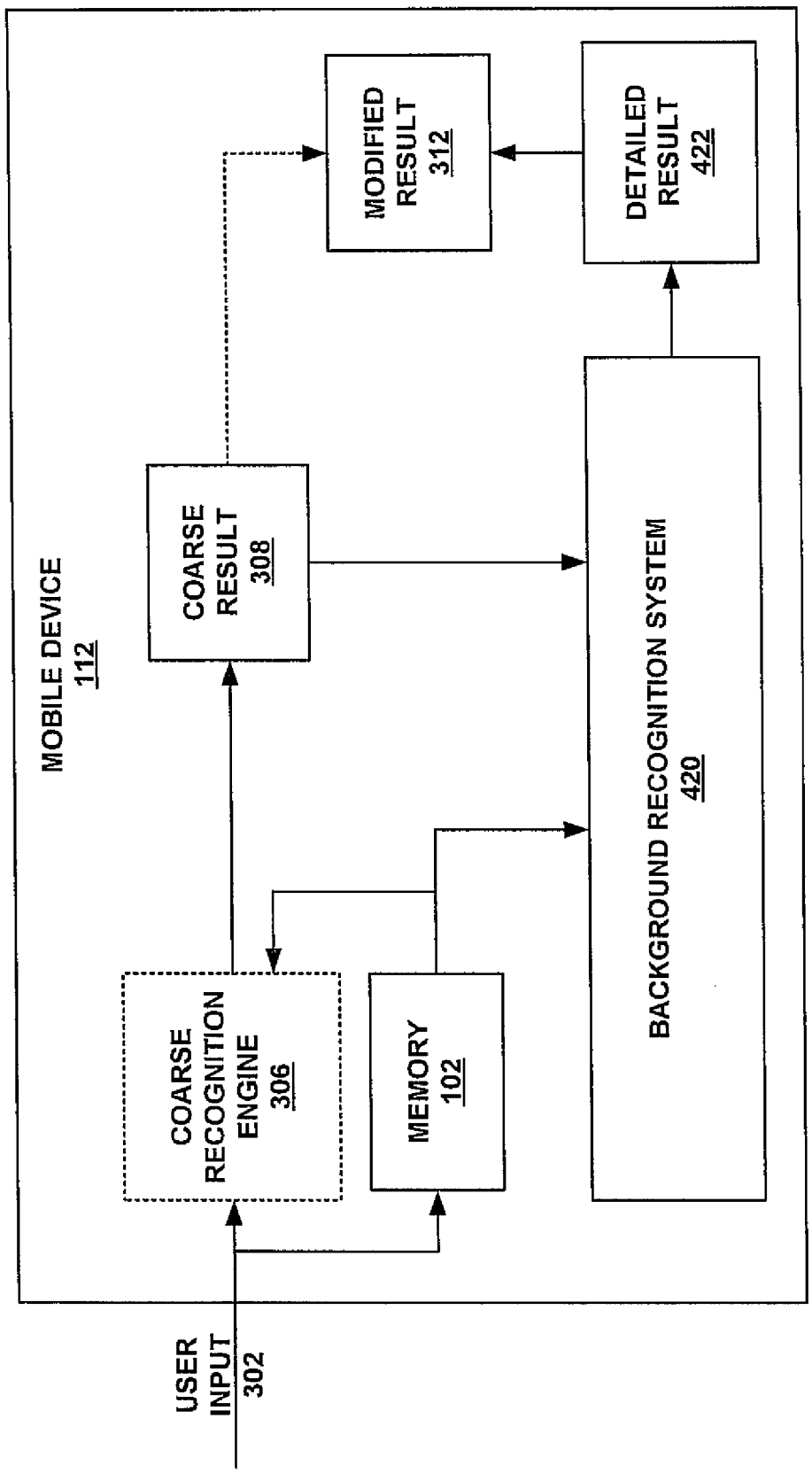
FIG. 4 is a block diagram or exemplary process of a combined computing system in accordance with one embodiment of the present invention.

A second embodiment of the system is disclosed in FIG. 4. Specifically, as shown in FIG. 4, the present invention can include, but is not limited to, user input 302 and mobile device 112. In one embodiment, user input 302 may be speech data, handwritten stroke data, image data, etc. Specifically, in one embodiment, mobile device 112 includes coarse recognition engine 306. In one embodiment, coarse recognition engine 306 is a software program that runs on a computer. Further, in one embodiment, a number of different recognition processes can be used with coarse recognition engine 306. Alternatively, in one embodiment, coarse recognition engine 306 may be a specially designed hardware piece made specifically for real-time voice recognition.

In one embodiment, mobile device 112 includes coarse result 308. In one embodiment, coarse result 308 is the output of coarse recognition engine 306. Specifically, coarse result 308 is a representation of user input 302 after it has completed the recognition processes of coarse recognition engine 306.

In one embodiment, mobile device 112 includes background recognition system 420. In one embodiment, background recognition system 420 can be very similar to coarse recognition engine 306. That is, in one embodiment background recognition system 420 can be a software program that runs on a computer. Further, in one embodiment, a number of different recognition processes can be used with background recognition system 420. Alternatively, in one embodiment, background recognition system 420 can be a specially designed hardware piece made specifically for detailed voice recognition.

In one embodiment, mobile device 112 includes modified result 312. In one embodiment, modified result 312 may be a representation of coarse result 308 and detailed result 422. In one embodiment, detailed result 422 is generated by background recognition system 420. Specifically, in one embodiment, with regard to modified result 312, background recognition system 420 has more computing resources available to it, while coarse recognition engine 306 is tailored to be a real-time feedback recognition. Thus, it is appreciated that, in one embodiment, detailed result 422 takes precedence over coarse result 308 as processed by modified result 312. Further, in one embodiment, any manual changes to coarse result 308 take precedence over detailed result 422 as processed by modified result 312.

Figure 7:
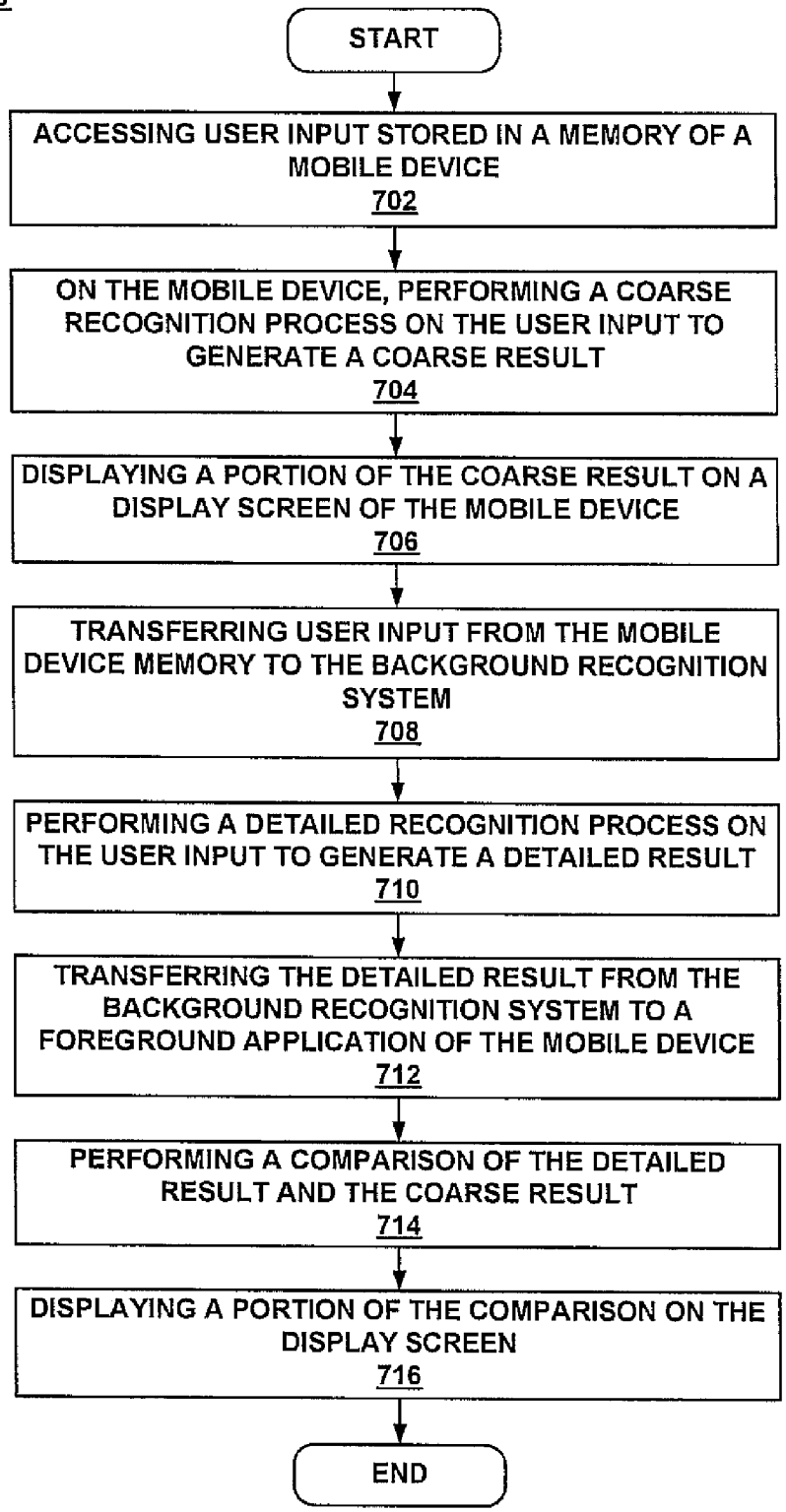
FIG. 7 is a flow chart of steps in an exemplary method for performing computer implemented recognition, in accordance with one embodiment of the present invention.

With reference now to step 702 of FIG. 7 and to FIG. 4, the present invention accesses user input 302 stored in a memory 102 of mobile device 112. In one embodiment, memory 104 may be used. In one embodiment, user input 302 may be speech data. In another embodiment, user input 302 may be handwritten stroke data. In yet another embodiment, user input 302 may be image data.

With reference now to step 704 of FIG. 7 and to FIG. 4, in one embodiment, the present invention, on mobile device 112, performs a coarse recognition process on user input 302 to generate coarse result 308. User input 302 may come directly from an input device or may be accessed from memory 102. In one embodiment, the input device may be communication interface 108. The coarse recognition engine may be implemented as a software recognition process using a number of well known recognition techniques. In one embodiment, the coarse recognition process takes place at coarse recognition engine 306. In one embodiment, coarse recognition engine 306 is constrained by allowable response time and attempts to operate in real-time. In another embodiment, coarse recognition engine 306 is constrained by computing resources.

With reference now to step 706 of FIG. 7 and to FIG. 4, in one embodiment, the present invention displays a portion of coarse result 308 on a display screen on mobile device 112. In one embodiment, the display screen on mobile device 112 is optional display device 105.

Referring now to step 708 of FIG. 7 and to FIG. 4, in one method embodiment, user input 302, which is stored in memory 102, is transferred to background recognition system 420. In one method embodiment, coarse result 308, or a portion of coarse result 308, is transferred to background recognition system 420 in conjunction with user input 302.

Referring now to step 710 of FIG. 7 and to FIG. 4, in one embodiment, the present invention performs a detailed recognition process on user input 302 to generate detailed result 422. Further, in one embodiment, detailed result 422 is generated on background recognition system 420 of mobile device 112. In one embodiment, the present invention generates detailed result 422 during background processing of mobile device 112. Specifically, in one embodiment, background recognition system 420 is not constrained by response time. Further, in one embodiment, background recognition system 420 is not constrained by computing resources.

With reference now to step 712 of FIG. 7 and to FIG. 4, in one embodiment, the present invention transfers detailed result 422 from background recognition system 420 to a foreground application of mobile device 112. Referring now to step 714 of FIG. 7 and to FIG. 4, in one embodiment, the present invention performs a comparison of detailed result 422 and coarse result 308. In one embodiment, modified result 312 is the comparison of detailed result 422 and coarse result 308.

With reference now to step 716 of FIG. 7 and to FIG. 4, in one embodiment, the present invention displays a portion of the comparison on display screen 105. Therefore, the same example as the previous embodiment again applies, that is, FIG. 8A shows one embodiment wherein mobile device 112 accesses user input 302. User input 302 stated "eleven am, lunch with dom." FIG. 8A shows coarse result 308 as shown on optional display device 105 as "eleven am, lunch with don."

Further, FIG. 8B shows one embodiment wherein, the present invention performs a detailed recognition process which results in "eleven am, lunch with dom." In one embodiment, the present invention performs a comparison of detailed result 422 and coarse result 308. In one embodiment, as shown in FIG. 9B, the difference between detailed result 422 and coarse result 308 is emphasized with visual script differentiation in modified result 312. It is appreciated that any user modifications made to coarse result 308 would take precedence over detailed result 422.

Although, in one embodiment, the difference between detailed result 422 and coarse result 308 is emphasized with visual script differentiation in modified result 312, the present invention is well suited to the use of many types of differentiation identification in modified result 312. Further, the present invention is well suited to the use of no type of differentiation identification in modified result 312. The present embodiment maintained visual script differentiation in modified result 312 merely for purposes of clarity.

Figure 5:
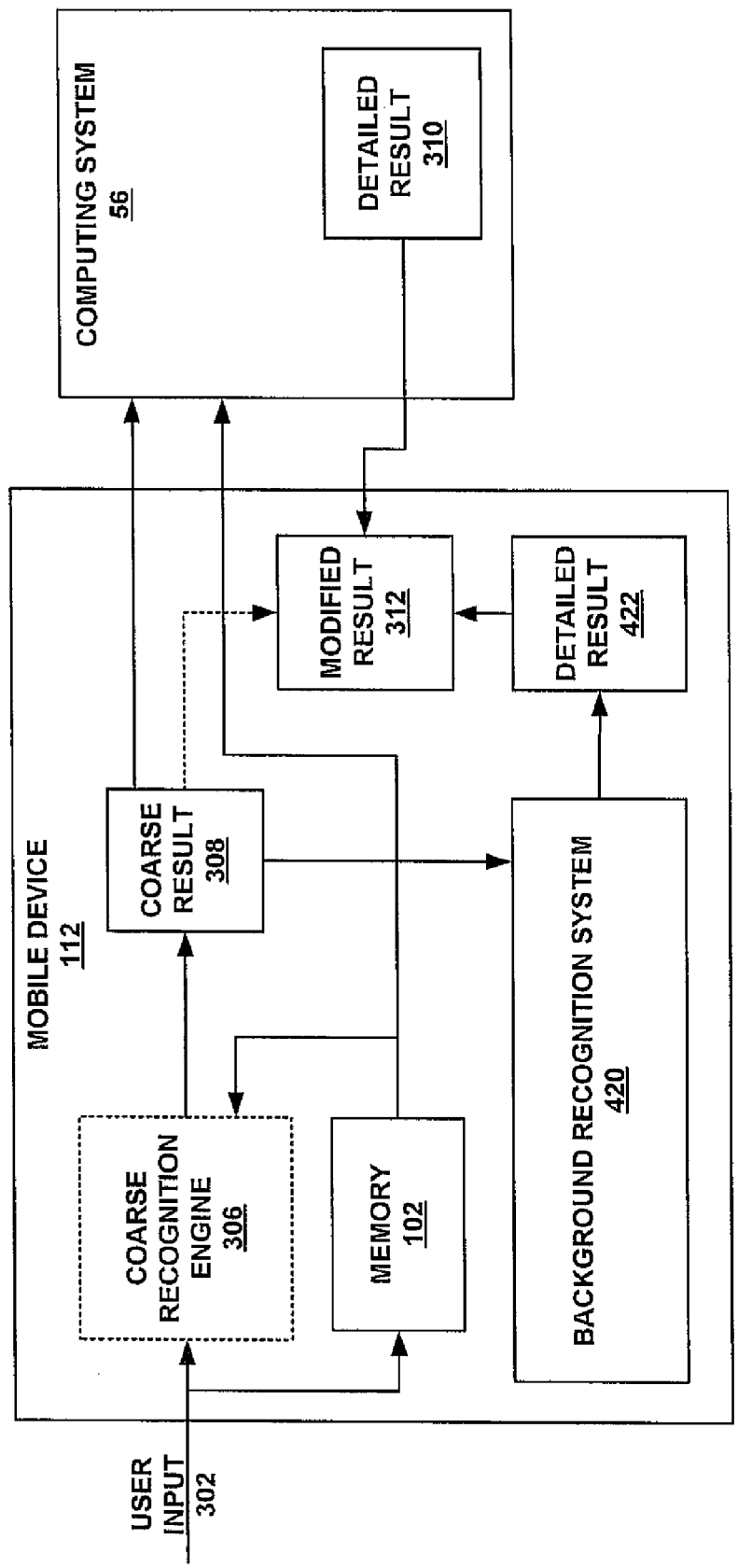
FIG. 5 is a block diagram or exemplary process of a combined computing system and two or more separate computing systems in accordance with one embodiment of the present invention.

Another embodiment of the recognition system is disclosed in FIG. 5. Specifically, in one embodiment, as shown in FIG. 5, the present invention can include, but is not limited to, both aspects of FIGS. 3 and 4. That is, in one embodiment, the recognition system is comprised of a mobile device 112 and computing system 56. Further, mobile device 112 includes background recognition system 420. For purposes of brevity and clarity only the differences with regard to the recognition system as shown in FIG. 5 will be emphasized.

Specifically, in one embodiment, the recognition system as shown in FIG. 5 comprises both of the previously mentioned embodiments. Further, in one embodiment, the recognition system as shown in FIG. 5 differs only in the method in which modified result 312 is processed. Specifically, with regard to modified result 312 of FIG. 5, the present invention performs a comparison of detailed result 310, detailed result 422 and coarse result 308. Specifically, in one embodiment, with regard to modified result 312, background recognition system 420 has more computing resources available to it, while coarse recognition engine 306 is tailored to be a real-time feedback recognition. Thus, it is appreciated that, in one embodiment, detailed result 422 takes precedence over coarse result 308 as processed by modified result 312. However, in one embodiment, computing system 56 has more computing resources available to it than background recognition system 420. Therefore, it is appreciated that, in one embodiments detailed result 310 takes precedence over detailed result 422 and coarse result 308 as processed by modified result 312. Further, in one embodiment, any manual changes to coarse result 308 take precedence over detailed result 422 and detailed result 310 as processed by modified result 312.

Thus, the present invention provides, in various embodiments, a method and system for performing computer implemented recognition and verification. The present invention also provides a method and system for performing computer implemented recognition which meets the above need and which performs a timely recognition process on a mobile device for user feedback. The present invention further provides a method and system for performing computer implemented recognition which meets the above needs and which provides a user access to the timely recognition results. The present invention also provides a method and system for performing computer implemented recognition which meets the above needs and which allows the timely recognition results to be amended.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method of performing computer implemented recognition comprising:
 a) accessing user input to be recognized;
 b) on a mobile device, performing a coarse recognition process on said user input to generate a coarse result;
 c) displaying a portion of said coarse result on a display screen of said mobile device;
 d) performing a detailed recognition process on said user input to generate a detailed result;
 e) performing a comparison of said detailed result and said coarse result; and
 f) displaying a portion of said comparison on said display screen.

2. A method as described in claim 1, wherein said detailed recognition process is performed on another computing system separate from said mobile device.

3. A method as described in claim 2 further comprising:
transferring said user input from said mobile device to said another computing system; and
transferring said detailed result from said another computing system to said mobile device.

4. A method as described in claim 3 further comprising:
transferring said coarse result to said another computing system in conjunction with said user input.

5. A method as described in claim 3, wherein said transferring is performed wirelessly over a wireless communications channel.

6. A method as described in claim 1, wherein said detailed recognition process is performed on said mobile device.

7. A method as described in claim 1, wherein said detailed recognition process is performed during background processing of said mobile device.

8. A method as described in claim 1, wherein said user input is speech data and wherein said coarse and said detailed recognition processes are speech recognition processes.

9. A method as described in claim 1, wherein said user input is handwriting data and wherein said coarse and said detailed recognition processes are handwriting recognition processes.

10. A method as described in claim 1, wherein said user input is image data and wherein said coarse and said detailed recognition processes are image recognition processes.

11. A method as described in claim 1, wherein said coarse recognition process is constrained by time and computing resources.

12. A recognition system comprising:
a mobile device accessing user input and performing a coarse recognition process thereon; and
a data link between said mobile device and another computing system;
wherein said another computing system is for receiving said user input from said mobile device and for performing a detailed recognition process thereon to return a detailed result to said mobile device.

13. The system as recited in claim 12, wherein said coarse recognition process is constrained with regard to allowable response time.

14. The system as recited in claim 12, wherein a result of said coarse recognition process is displayed upon a display screen of said mobile device.

15. The system as recited in claim 12, wherein said data link is wireless.

16. The system as recited in claim 12, wherein said data link is wired.

17. The system as recited in claim 12, wherein said another computing system is not constrained by response time.

18. The system as recited in claim 12, wherein said another computing system also receives a portion of the result of said coarse recognition process.

19. The system as recited in claim 12, wherein a comparison of said detailed result and result of said coarse recognition process is performed and a portion of said comparison is displayed on a display device of said mobile device.

20. A recognition system comprising:
a mobile device accessing user input and performing a coarse recognition process thereon; and
a background recognition process performed on said mobile device, wherein said background recognition process performs a detailed recognition process on said user input, said background recognition process returning a detailed result to a foreground application of said mobile device.

* * * * *